Patented May 20, 1941

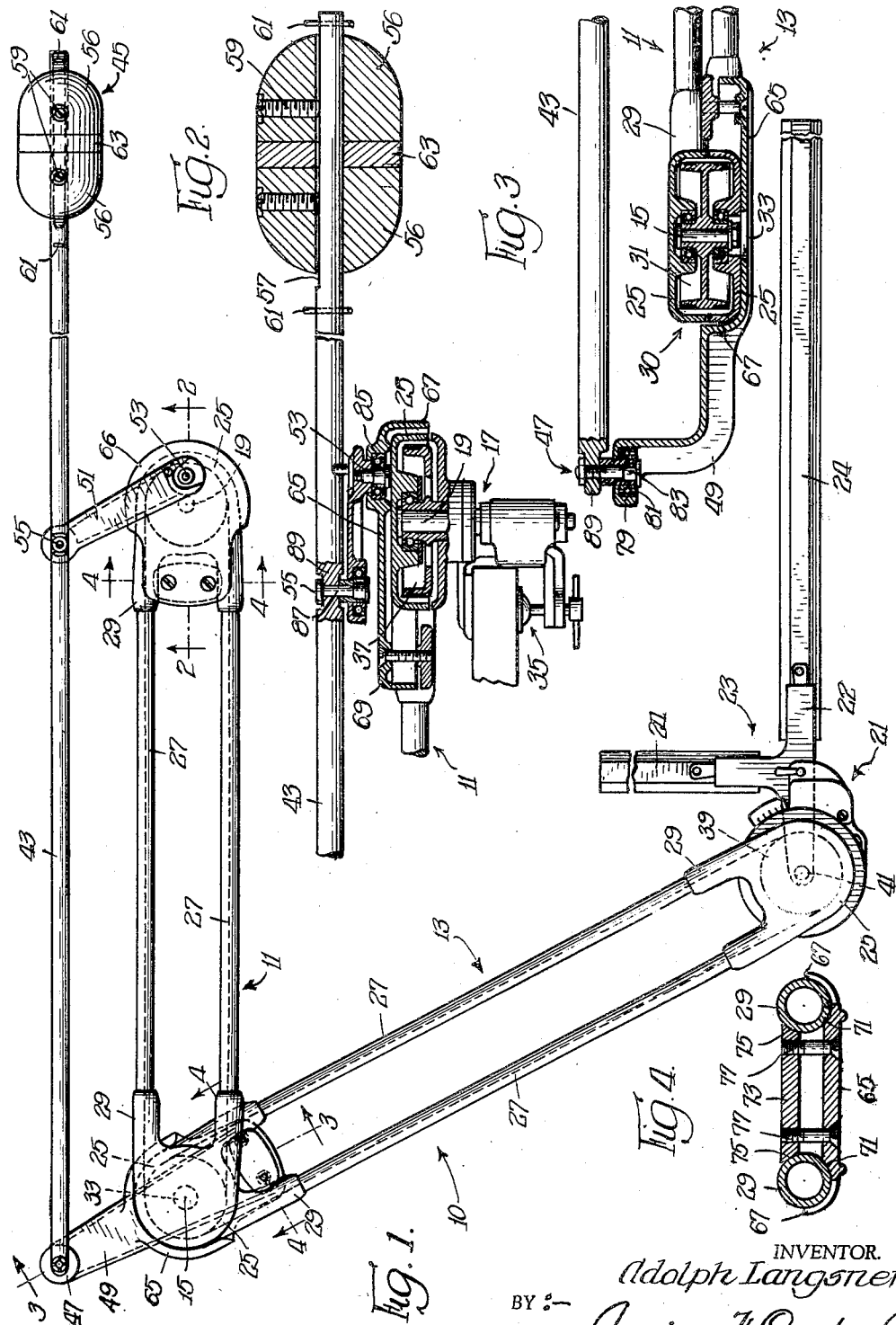

2,242,828

UNITED STATES PATENT OFFICE 2,242,828

DRAFTING DEVICE

Adolph Langsner, Chicago, Ill., assignor to Eugene Dietzgen Co., Chicago, Ill., a corporation of Delaware Application November 6, 1939, Serial No. 302,944

5 Claims. (Cl. 33—79)

My invention relates in general to drafting equipment and has more particular reference to parallel motion mechanism, the invention more especially relating to the counterbalancing of parallel motion drafting equipment of the sort adapted for mounting on a drawing board or table to support a ruling guide for free and unrestricted movement within a drafting area, while maintaining the ruling guide in adjusted, relative angular relationship with respect to the board or table throughout the movement thereof within said drafting area.

An important object of the invention is to provide counterbalance means to support the parallel motion mechanism in any position to which it may be moved on a drawing board or table that is inclined; a further object being to minimize the muscular effort of moving a parallel motion device in a plane of operation that is inclined with respect to the horizontal.

It will be apparent that the unbalanced weight of a parallel motion device of the character mentioned becomes progressively more effective as the inclination of the plane, in which the device operates, is increased with respect to the horizontal. This unbalanced weight requires muscular effort in moving the device in an inclined plane. Furthermore, when the operating plane is at an angle exceeding a critical inclination at which the device may slip upon the drafting surface, it will be necessary to hold the device, in order to retain it in any adjusted position. It is an important object of my present invention to provide a parallel motion mechanism avoiding these defects.

Another important object is to provide, in a parallel motion device comprising a pair of articulated arms, counterbalance means effective to balance the mass of both arms in order to maintain the same in adjusted position in an inclined plane and also to minimize the effort required in moving the device.

Another important object is to provide counterbalance means adjustable to vary the counterbalancing effect, whereby the means may be adjusted in accordance with the inclination of the plane in which it may be desired to operate the device.

Another important object resides in providing counterbalance means of the character mentioned in the form of an attachment that may be readily mounted upon a parallel motion drafting apparatus to condition the same for operation in a steeply inclined plane, while permitting the apparatus to be used without the counterbalancing means on horizontal drafting boards, or where the board is but slightly tilted from the horizontal.

Another important object is to provide, in drafting apparatus comprising a pair of relatively pivoted arms, including a swinging arm adapted to carry a ruling guide at the free end thereof, and another arm having an end adapted for pivotal attachment on a drafting board or table, counterbalancing means comprising a stem having adjustable weight means thereon and adapted for pivotal connection on the swinging arm, the stem being rockably coupled on the other arm to maintain parallel relationship therewith at all times; a further object being to pivot the stem on an extension of said swinging arm so that the point of connection of the stem with the swinging arm and the free end of said arm lie on opposite sides of its connection with the other arm; a still further object being to utilize roller bearings for connecting the stem on the arms.

These and numerous other objects, advantages, and inherent functions of the invention will be apparent from the following description, which, taken in connection with the accompanying drawing, discloses a preferred embodiment of the invention.

Referring to the drawing:

Figure 1 is a diagrammatic view of a parallel motion device, containing counterbalance means embodying my present invention; and Figures 2, 3 and 4 are sectional views, respectively, taken substantially along the lines 2—2, 3—3 and 4—4 in Figure 1.

To illustrate my invention, I have shown on the drawing parallel motion mechanism 10, comprising means forming a pair of arm elements 11 and 13 connected together for relative rotation about an axis 15 adjacent an end of each arm, means 17 being provided at the opposite end of the arm 11 for anchoring it on a drafting board or table for rotation about a stationary axis, preferably formed by a stationary pin 19. The free end of the arm 13, opposite from the pivot 15, carries means 21 for supporting a ruling element 23 for parallel movement, said element 23, in the illustrated embodiment, comprising straight edge members 24 supported on a mounting 22, which, in turn, is carried on the free end of the arm 13.

The arms 11 and 13 may be of any preferred construction and may carry any preferred parallel motion mechanism for maintaining the means 21, and the ruling guides 24 thereon, at a predetermined relative angular position with respect to the drawing board or table on which the mechanism may be attached.

In the illustrated embodiment, the arms 11 and 13 each comprise a pair of housing elements 25, forming the opposite ends of the arm, and a pair of hollow, tubular spacers 27, the opposite ends of which are secured in sleeve-like housing extensions 29, forming sockets for the reception of the ends of the spacers 27.

The housing elements 25 preferably are of substantially identical construction, for convenient and inexpensive fabrication, and preferably comprise shallow shells, each having a cylindrical rim and a flat end wall on one side of the shell, the other side of the shell being open. The end wall of each housing element 25 carries flange means, forming a bearing seat centrally within the rim of the shell in which roller bearings may be mounted. The housing elements 25, at the outer ends of the arm 11 and at the free end of the arm 13, are arranged with their open ends facing downwardly toward the surface on which the device is mounted. The housing element 25, at the end of the arm 13 which is connected to the arm 11, is arranged with its open end facing upwardly, so that the housing elements 25, at the connected ends of the arms 11 and 13, as shown clearly in Figure 3 of the drawing, cooperate to form a housing 30. This housing contains a pulley 31, having a rim extending within the peripheral portions of the housing, the pulley being mounted on a pin 33, which is journaled for rotation in the roller bearings carried by the cooperating shells forming the housing 30.

The anchored end of the arm 11 is pivotally mounted upon the shaft 19, which forms a part of the support means by which the device is or may be fastened upon the drawing board or table, the pin 19, to that end, being supported in a clamp structure 35, as shown in Figure 2. The housing element 25, at the anchored end of the arm 11, is journaled on the pin 19 by means of the roller bearing mounted therein, and the pin 19 also carries a pulley or wheel 37 extending within the housing element and having a rim enclosed within the peripheral rim of the housing element. The wheel 37 is mounted fast on the pin 19 and is held from rotation with respect to the mounting means 17 and the table on which the device is or may be attached.

The housing element 25, at the free end of the arm 13, likewise contains a pulley or wheel 39 therein, which pulley is fast on an axle 41 supported turnably in the housing element in the centrally mounted roller bearing thereof. The ruling guide support means 21, in turn, is carried by the pulley 39 and comprises means for adjusting the guide support 22 to a desired relative angular position with respect to the axis of the pin 41 and for clamping the parts in adjusted position.

It will be noted that the socket forming extensions 29, which receive the tubular spacers 27, are formed on the housing elements 25 tangentially with respect to the rims of the pulleys 31, 37 and 39, and it will be noted also that the pulleys are formed with peripheral grooves, there being two grooves in the pulley 31 and a single groove in each of the pulleys 37 and 39. The grooves in all of the pulleys, however, are of like width and depth, and are adapted to receive flexible driving means, preferably comprising an endless belt, in each of the arms 11 and 13. These belts may conveniently comprise lengths of metal tape, the opposite ends of each tape being connected together by suitable fastening means, allowing for adjustment so that the belts may be drawn up to a desired tension upon the carrying pulleys. These belts form a frictional driving engagement on the pulleys, and since the anchored pulley 37 is held against rotation with respect to the drawing board or table on which the device may be mounted, it will be apparent that the pulley 39, at the free end of the arm 13, will be held by the belts against rotation and consequently will support the ruling guides against relative rotation with respect to the drawing surface.

It will be apparent, however, that where the mechanism is mounted upon an inclined drawing board, the mass of the arms 11 and 13 will tend to urge the same in a downward direction on the drawing board. This arm urging effect of the unbalanced mass of the arms, it is true, will not become effective to move the arms from adjusted position unless the inclination of the drawing board is such that the frictional resistance to movement at the free end of the arm 13 should be less than the arm moving force, due to the unbalanced mass of the arms. The unbalanced mass, however, becomes effective when the device is mounted on a drafting table, having an inclination with respect to the horizontal which is greater than the critical inclination at which the arm moving component of the force of gravity exceeds the frictional resistance to movement of the free end of the arm 13 resting on the drawing table. Consequently, when used on boards at an inclination in excess of the critical inclination, it becomes necessary that the draftsman hold the end of the arm 13 in order to retain the ruling guides in an adjusted drafting position. The necessity of thus holding the apparatus in place may induce considerable fatigue over an extended period of time, particularly if sizable apparatus is involved. Furthermore, an appreciable fatigue factor is encountered due to the necessity of moving the apparatus throughout a drafting, this fatigue factor, of course, being additive to the inconvenience deriving through the necessity of holding the mechanism in adjusted position.

In order to overcome the undesirable fatigue effects of using drafting apparatus of the character mentioned on sharply inclined drawing surfaces, and to provide parallel motion apparatus that may be adjusted in order to accurately counterbalance the mass of the parts and thereby allow the parts to remain in adjusted position without holding the same, and to be readily shifted in weightless fashion within the drafting area, I have provided counterbalancing means comprising a stem 43 having weighted means 45 thereon and connected on the arms 11 and 13 in order to counterbalance the weight thereof about the pin 19, the rod 43 being so connected as to maintain parallelism with the arm 11 regardless of the relative position of said arms 11 and 13. To this end, the arm 43 is pivotally connected, as at 47, on an extension 49 of the arm 13, the point of connection of the rod 43 on the arm 13 being on the side of the pivotal axis 15 remote from the free end of said arm 13, whereby the weight of said arm about the axis 15 may be counterbalanced by the thrust of the weighted stem 43 on the extension 49. The rod or stem 43 is also connected with the arm 11 by means of a connector 51, comprising an arm pivoted, as at 53, for free tilting movement on the arm 11 about an axis lying in the plane of the axes of the pins 19 and 33. The other end of the arm 51 is pivotally connected, as at 55, on the stem 43, the arrangement being such that the arm 51 is at all times parallel with the extension 49, regardless of the relative movement of the arms 11 and 13, so that the rod 43 is at all times parallel with respect to the arm 11.

The weighted means 45 is carried on the rod 43 on the side of the pivotal connection 55 remote from the connection 47 so that, so far as the arm 11 is concerned, the weighted means 45 may exert a turning moment upon the arm 11 about the axis of the pin 19 directionally opposed to the turning moment produced by the weight of the arms 11 and 13. The weighted means 45 preferably comprise one or more annular members 56, slidably received on the end of the rod 43, said end being formed with a flattened surface 57 forming a seat for receiving the ends of set screws provided in the weight members 56 for clamping the same on the rod 43. As shown, more particularly in Figure 2, the weight means 56 may have rounded ends to improve the appearance thereof, and one or more disk-like members 63 may be assembled on the stem between a pair of rounded end members 56 in order to increase the mass of the weighted means 45. I also prefer to provide the rod 43 with cotter pins 61 extending in diametrical openings in the rod 43 on opposite sides of the weighted means 45 in order to limit the extent of adjustable movement of the weight means on the rod.

The counterbalancing means may, of course, be assembled directly on and as a part of the drafting apparatus by forming the projection 49 as an integral part of the housing element 25 at the supported end of the arm 13 and by anchoring the arm 51 rotatably on the housing portion 25 at the anchored end of the arm 11. I prefer, however, to form the counterbalancing means as an attachment adapted for facile mounting on the drafting apparatus, so that the apparatus may be used either with or without the counterbalancing means, as the exigencies of circumstance may dictate. To this end, therefore, I provide mounting shoes 65 and 66, preferably comprising castings adapted to fit upon and be secured to the housing portions 25 forming the supported ends of the arms 11 and 13. These mounting shoes 65 and 66 both comprise shell-like members, each having a peripheral rim 67 formed to snugly engage the cylindrical portions of the member 25 on which adapted for mounting. Each of the shoe members 65 and 66 also has a portion 69 extending between the socket forming projections 29 of the shell on which mounted, the opposed edges of the portion 69 being beveled, as at 71, to snugly receive said projections 29. Means is provided for anchoring the shoes 65 and 66 in place on the housing members 25, said means, in the illustrated embodiment, comprising an anchoring plate 73 for each shoe, the anchoring plate 73 having its opposed edges beveled, as at 75 to snugly receive the projections, and the plate being held to the shoe by means of headed fastening screws 77 passing through openings in the shoe portion 69 and received in the threaded openings formed in the plate 73, whereby the portions 29 are clampingly received between the shoe portion 69 and the holding plate 73, whereby said shoe is firmly anchored on its supporting housing portion 25.

The shoe 65, which is adapted for mounting on the housing member 25 at the pivoted end of the arm 13 is, as shown in Figure 3 of the drawings, provided integrally with the rod carrying projection 49. This projection 49 is preferably formed at its end with a seat 79 in which I prefer to arrange a roller bearing 81. The bearing 81 receives stud means 83, which is fastened on and forms a part of the rod 43, the rod being thus freely pivoted on the projection 49.

The shoe 66, which is provided for attachment on the housing 25 at the anchored end of the arm 11, is formed preferably with a boss 85 in which a roller bearing is assembled. This roller bearing may be similar in form and construction to the bearing 81, and it rotatably supports a pin 87 fixed in the arm 51 in order to provide the pivotal mounting of the arm 51 on the arm 11, which mounting is shown at 53. The opposite end of the arm 51 is formed with a suitable seat in which is fastened a roller bearing which may be similar to the bearing 81 in form and construction, and this bearing carries a pin which is fast on the rod 43, whereby said rod is supported on the arm 51 for pivotal relative movement between the rod 43 and arm 51. The pivot pins 83 and 87 preferably comprise sleeve members secured on the rod 43 by headed screws passing through the sleeves and engaging in threaded openings formed in the rod 43 at flattened portions 89 formed on the rod at the end and intermediate the ends thereof.

The foregoing apparatus has been found to be convenient in that it may be applied to existing parallel motion apparatus with ease. When applied, the counterbalancing means may be adjusted to exactly balance the weight of the arms forming the parallel motion apparatus, so that the same may be moved without effort when operating on steeply inclined and even vertical drafting boards. The counterbalancing means of my present invention does not impart any drag upon the parallel motion apparatus, which may be moved without effort when fitted with the counterbalance mechanism herein described. Even the heaviest parallel motion mechanism, when counterbalanced as herein taught, becomes substantially weightless so far as any effort in moving the same within a drafting area is concerned.

It is thought that the invention and its numerous attendant advantages will be understood from the foregoing description, and it is obvious, of course, that numerous changes may be made in the form, construction, and arrangement of the several parts without departing from the spirit and scope of the invention or sacrificing any of its attendant advantages.

The invention is hereby claimed as follows:

1. Balancing means for parallel motion apparatus comprising, in combination with the relatively pivoted swinging and anchored arms of the apparatus, a weighted member pivotally connected on the swinging arm of the apparatus and coupled with the anchored arm to maintain parallelism between said weighted member and said anchored arm, weight means shiftable on said weighted member and comprising a pair of end pieces and an intermediate disk, and means to clampingly secure the end pieces in adjusted position on the member on opposite sides of the intermediate disk to hold the same in adjusted position between the end pieces.

2. Balancing means for parallel motion apparatus comprising, in combination with the relatively pivoted swinging and anchored arms of the apparatus, a weighted member pivotally connected on the swinging arm of the apparatus and coupled with the anchored arm to maintain parallelism between said weighted member and said anchored arm, said weighted member comprising a stem of circular section, circular weight means perforated to receive the stem for movement longitudinally on the stem and radial set screw means in the weight means for clamping the same in adjusted position on the stem, said stem having a flat clamping surface on a side thereof, and spaced pins on said stem defining limits of adjusting movement of said weight means.

3. Balancing means for parallel motion apparatus of the type comprising arms having pivotally interconnected ends and in which one of the arms comprises a supporting arm formed for pivotal mounting on a working base and the other comprises a supported arm for carrying drafting guide means, said balancing means comprising a pair of shoes and clamp means for rigidly securing said shoes, the one demountably on the supporting arm and the other demountably on the supported arm, a carrier bar pivotally mounted on one of said shoes, a link pivotally connected with said carrier bar and on the other of said shoes, and weight means adjustable on said carrier bar.

4. Balancing means for parallel motion apparatus of the type comprising arms having pivotally interconnected ends and in which one of the arms comprises a supporting arm formed for pivotal mounting on a working base and the other comprises a supported arm for carrying drafting guide means, said balancing means comprising a pair of shoes and clamp means for rigidly securing said shoes, the one demountably on the supporting arm and the other demountably on the supported arm, said shoes having co-operating portions adapted for interfitting relationship with said arms when clamped thereon to prevent relative rotation between the arms and the shoes, a carrier bar pivotally mounted on one of said shoes, a link pivotally connected with said carrier bar and with the other of said shoes, and weight means adjustable on said carrier bar.

5. Balancing means for parallel motion apparatus of the type comprising arms having pivotally interconnected ends and in which one of the arms comprises a supporting arm formed for pivotal mounting on a working base and the other comprises a supported arm for carrying drafting guide means, said arms each comprising a head forming spaced-apart portions, said balancing means comprising a pair of shoes and clamp means for rigidly securing said shoes, the one demountably on the supporting arm and the other demountably on the supported arm, each of said shoes comprising a shell formed to receive a said head, a projection on said shell in position to fit between the spaced portions of the head, clamp means for securing the shell on the head with the projection in place between said spaced apart portions of the head to maintain the shoe in alignment on the head, a carrier bar pivotally mounted on one of said shoes, a link pivotally connected with said carrier bar and with the other of said shoes, and weight means adjustable on said carrier bar.

ADOLPH LANGSNER.